May 6, 1941.   D. HEYER   2,240,650
AUTOMATIC POWER TRANSMISSION
Filed May 27, 1939   7 Sheets-Sheet 1

INVENTOR.
DON HEYER,
BY Rippey & Cassidy
ATTORNEYS.

May 6, 1941.  D. HEYER  2,240,650
AUTOMATIC POWER TRANSMISSION
Filed May 27, 1939  7 Sheets-Sheet 2

INVENTOR.
DON HEYER,
BY Rippey & Cassidy
ATTORNEYS.

May 6, 1941.　　　　　D. HEYER　　　　　2,240,650

AUTOMATIC POWER TRANSMISSION

Filed May 27, 1939　　　7 Sheets-Sheet 4

INVENTOR:
DON HEYER,
BY Rippey & Cassidy
ATTORNEYS.

May 6, 1941. D. HEYER 2,240,650
AUTOMATIC POWER TRANSMISSION
Filed May 27, 1939 7 Sheets-Sheet 6

INVENTOR:
DON HEYER,
BY Rippey & Cassidy
ATTORNEYS.

Patented May 6, 1941

2,240,650

UNITED STATES PATENT OFFICE 2,240,650

AUTOMATIC POWER TRANSMISSION

Don Heyer, St. Louis, Mo.

Application May 27, 1939, Serial No. 276,107

27 Claims. (Cl. 74—189.5)

This invention relates to automatic power transmission; and has special reference to power transmission mechanisms operative to circulate and discharge fluid against impeller devices of the driven member to operate and to effect a change in speed thereof in proportion to the amount of force created by the fluid acting against the same.

Objects of the invention are to provide an improved automatic power transmission mechanism having a driving impeller arranged in such a relationship with respect to a cooperating driven impeller that the fluid circulated and discharged by the driving impeller will automatically maintain the driven impeller at approximately the same rate of speed under all load conditions; to provide a differential gearing effecting a greater reduction in speed between the driving and driven impellers than the slip induced by the fluid; to provide a series of cooperating elements for effecting circulation of the fluid through the driven and driving parts of the mechanism; to provide means in connection with the power transmission mechanism for controlling the flow of fluid therethrough so as to maintain the operation of the driven mechanism in accordance with the torque required; and to provide manual means for varying the speed at which the driven mechanism will be operated by controlling the amount of fluid in the impeller chamber.

Another object of the invention is to provide manually set and automatically operable mechanism for controlling the flow of fluid into the impeller chamber, and means for visually indicating the speed at which the driven mechanism is operated.

Another object of the invention is to provide an improved automatic power transmission mechanism embodying the useful cooperative relationship of elements herein disclosed, functioning to attain the new and useful results and effects and applicable to many uses, all of which should be apparent from the following description, reference being made to the annexed drawings, in which—

Fig. 1 is a longitudinal sectional view of an automatic power transmission mechanism made in accordance with the present invention.

The shaft 1 of an electric motor or other source of power 2 is rotatively journalled in and extends beyond a bearing 3 and is constantly rotated when the power source 2 is operating. A housing 4 for the speed control mechanism is attached to the end bracket of the motor 2 by bolts 5. A leak-proof joint between the abutting parts 2 and 4 is provided.

A shaft 6 telescopes on and is supported by the extended end of the shaft 1 and attached to said shaft 1 by a key 7 for rotation thereby. The shaft 6 is wholly within the housing 4. A driving impeller unit comprising a wall 8 and a series of vanes 9 is attached to the shaft 6 by a key 10 for rotation by said shaft. The vanes 9 extend radially and longitudinally with respect to the axis of the shafts 1 and 6. A driven impeller unit comprising a wall 11 cooperating with the wall 8 to form an impeller chamber, and a series of vanes 12 integral with said wall 11, is mounted on a bushing 13 rotative on the shaft 6. The vanes 12 are complementary to the vanes 9 so that, when the enclosure formed by the walls 8 and 11 is substantially filled with fluid, the driving impeller will create a force whereby the fluid will operate the driven impeller at approximately the same speed therewith. A space 14 may be provided between the adjacent edges of the walls 8 and 11 for the discharge or outflow of fluid from the space within and between said walls. A thrust washer 15 is located between the hubs of the walls 8 and 11 and between the bushing 13 and the hub of the wall 8 to maintain said parts in proper cooperative relationship.

Figures 2, 7, 8:
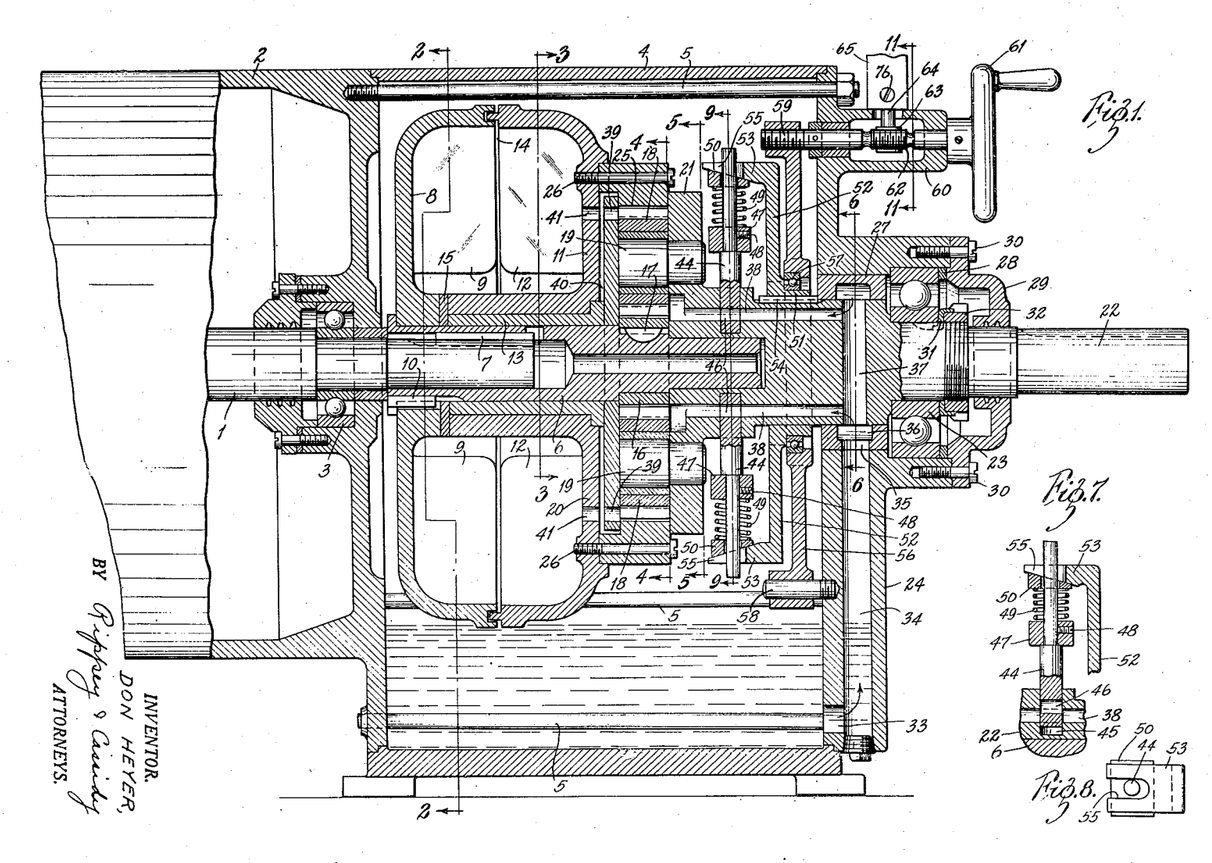
Fig. 2 is a cross-sectional view through the driving mechanism on the line 2—2 of Fig. 1.
Fig. 7 is a sectional view similar to a part of Fig. 1 showing one of the valves in position to restrict circulation of fluid.
Fig. 8 is an outer end elevation of the device shown in Fig. 7.
Figure 2:
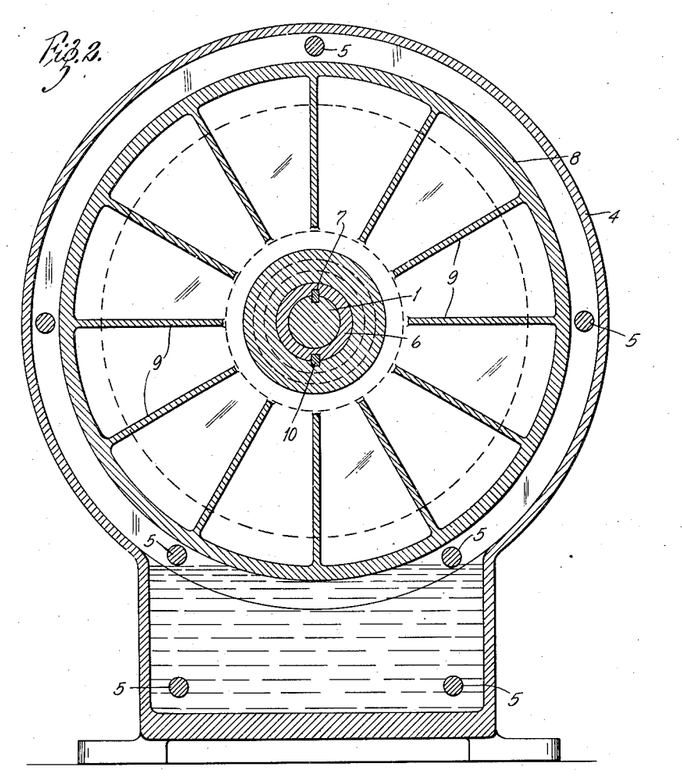
Figure 3:
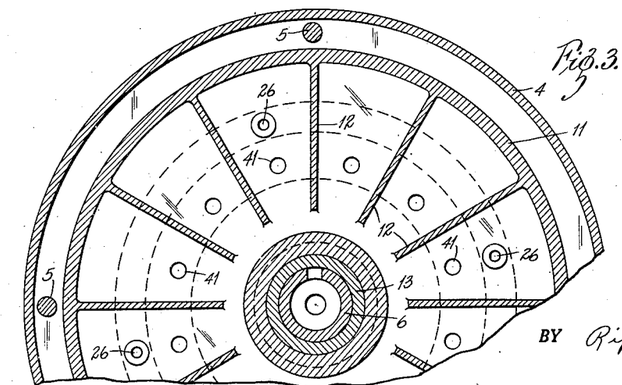
Fig. 3 is a cross-sectional view of a part of the driven mechanism on the line 3—3 of Fig. 1.
Figures 4, 5, 6, 9, 10:
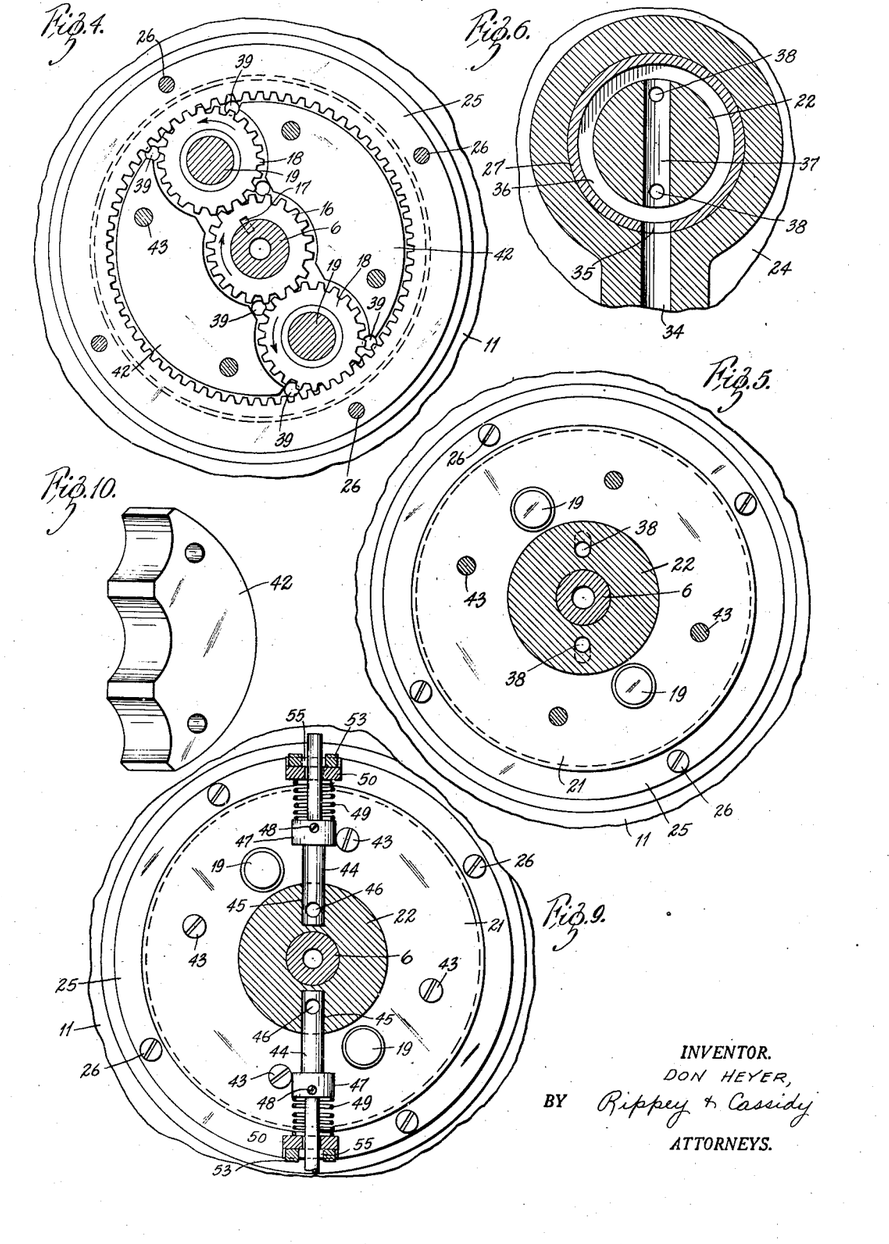
Fig. 4 is a sectional view of the driven mechanism on the line 4—4 of Fig. 1.
Fig. 5 is a cross-sectional view on the line 5—5 of Fig. 1.
Fig. 6 is a sectional view on the line 6—6 of Fig. 1 showing the fluid passages.
Fig. 9 is a cross-sectional view on the line 9—9 of Fig. 1.
Fig. 10 is a perspective view of one of the members comprised within the fluid gear pump housing.

A pinion 16 (Figs. 1 and 4) is attached to the shaft 6 by a key 17 and is thereby rotated constantly with the shaft 1 and at the same speed. The pinion 16 meshes with a pair of diametrically opposite pinions 18 mounted for rotation on stud shafts 19 and against the outer surface of a cover plate 20 supported for relative rotation on the shaft 6 against the end of the bushing 13. The stud shafts 19 are carried by a flange 21 formed in connection with a shaft 22 held in axial alinement with the shafts 1 and 6 by telescoping engagement with the latter and by a bearing 23 in the end plate 24 for the housing 4. The pinions 18 are in constant mesh with an internal gear 25 having a machined fit against the wall of the driven impeller 11 and against the side of the flange 21 and attached to the driven impeller 11 by screws 26. Thus, the plate 20, the flange 21, and the internal gear 25 cooperate to form a housing for the pinions 16 and 18 in which the internal gear 25 is fitted closely between the plate 20 and flange 21. The shaft 22 is free to rotate in the bearing 23 and bushing 27 relative to the shafts 6 and 1 and at different speed with respect thereto. The bearing 23 is held in place by a spacer 28, a cap 29, and fastener screws 30 securing the cap 29 to the housing end plate 24 and cooperating with a lock washer 31 and a lock nut 32 screwed on the shaft 22 (Fig. 1).

A port 33 in the lower portion of the end plate 24 opens into a passage 34 in said end plate. The passage 34 communicates through a port 35 with an annular passage 36 formed in the inner portion of the bushing 27. Because of the fact that the bushing 27 is rigid in the end plate 24, the passage 34 is in continuous communication with the annular passage 36. A passage 37 is formed diametrically through the shaft 22 and has its ends opening into the annular passage 36, and has communication through passages 38. Ports 39 through the plate 20 form constant communication between the inside of the fluid gear pump and the space 40 from which ports 41 open into the impeller chamber formed by the impeller walls 8 and 11. Consequently, when the mechanism is operating, it is possible for fluid contained in the bottom of the housing 4 to flow continuously to the impeller chamber through a passage comprising the port 33, passage 34, port 35, passages 36, 37 and 38, and ports 39 and 41, and from the impeller chamber through the space 14 between the impeller walls 8 and 11, and to rotate the shaft 22 at approximately the predetermined speed even under full load conditions. In this operation, the pinions 18 function as gearing for driving the shaft 22 in cooperation with the impeller mechanism, and also function as a fluid gear pump device for pumping oil from the housing 4 through the passage described into the chamber formed by the impeller walls 8 and 11. The fluid gear pump structure comprises the internal gear 25, the pinions 17 and 18, and the two elements 42 (Figs. 4 and 10) secured within the pinion housing by screws 43 attaching said elements 42 to the flange 21 and plate 20.

Valves are provided to regulate the flow of fluid through the passage leading to the impeller chamber, and are arranged to be operated automatically by centrifugal force to control the speed of rotation of the shaft 22. The invention comprises manually operative means for controlling the operation of said valves in cooperation with centrifugal force, and also an indicator to indicate visually the speed of operation of the shaft 22 or the mechanism driven thereby.

In the specific arrangement shown in Fig. 1, valves 44 are mounted for radial movements in radial holes 45 in the shaft 22 crossing and of larger diameter than the diameter of the passages 38. These valves 44 have ports 46 therethrough which are in complete registration with the passages 38 when the valves 44 are at their innermost positions, which are their open positions. When the valves 44 are moved radially outward, the ports 46 are partly or completely disalined from the passages 38, thereby partially or completely closing said passages and regulating the flow of liquid to the impeller chamber.

Figure 11:
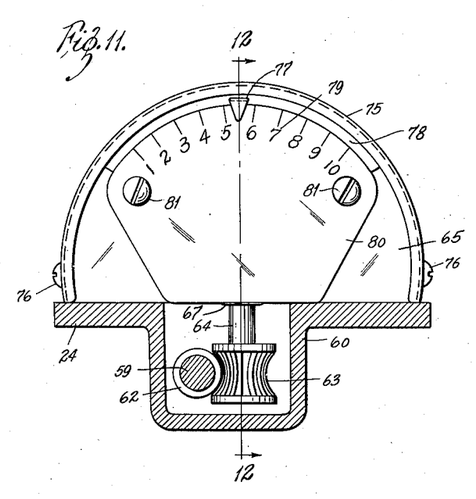
Fig. 11 is a sectional view showing the actuator for a speed indicator and for the valve regulator associated with the driven mechanism.
Figure 12:
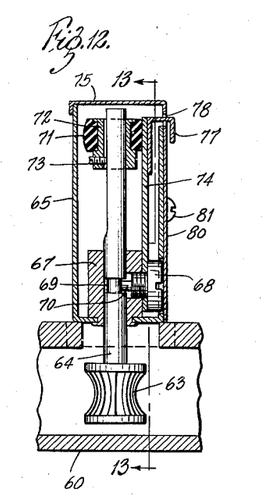
Fig. 12 is a sectional view on the line 12—12 of Fig. 11.
Figure 13:
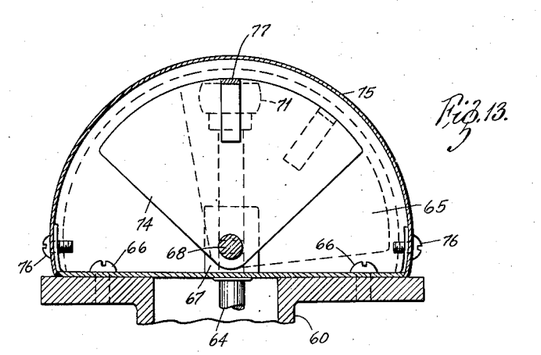
Fig. 13 is a sectional view on the line 13—13 of Fig. 12.

A collar 47 is mounted on each valve 44 and may be rigidly attached in different adjusted positions thereon by set screws 48. Springs 49 on the stems of the valves 44 have their inner ends seating against the collars 47 and their outer ends pressing against cams 50 mounted for sliding movements along the stems of said valves. A spider comprising a hub 51, arms 52 and cams 53 is attached for sliding movements to the shaft 22 by a key 54. The cams 53 have slots 55 therein receiving the stems of the valves 44 and permitting the spider to be moved longitudinally along the shaft 22. The cams 53 constitute abutments for the cams 50 to hold the springs 49 under compression and to vary the compression of said springs as desired in order to vary the amount of centrifugal force required to overcome the power of said springs and operate the valves 44. A spider 56 is mounted on the hub 51 by a bearing 57 and has one arm engaging a guide 58 attached to the end wall 24. A rod 59 is rotatively supported by the walls of a housing 60 attached to the end wall 24, and is incapable of longitudinal movement. The inner end of the rod 59 is screwed into a threaded hole in one arm of the spider 56 so that, when said rod 59 is rotated, the spider 56, and thereby the cams 53, will be moved. When the cams 53 are moved inwardly, they will operate the cams 50 to increase the compression of the springs 49; and, when the cams 53 are moved outwardly, compression of the springs 49 is relieved. This variation in the compression of the springs 49 regulates the speed of rotation of the shaft 22 by determining the amount of centrifugal force created by rotation of said shaft that will operate the valves 44 to regulate or close the passages 38 through which fluid passes to the impeller chamber. The outer end of the rod 59 is equipped with a manual device 61 whereby said rod may be rotated. A worm 62 formed on the rod 59 engages a worm 63 attached to the lower end of a spindle 64 rotatively supported within a housing 65 attached to the upper wall of the housing 60 by removable and replaceable fasteners 66 (Figs. 11 and 13). The spindle 64 is rotative within a bearing 67 attached to the housing 65. A screw 68 extends through a hole in one wall of the housing 65 and is screwed into the bearing 67. The spindle 64 is formed with a circumferential groove 69 within which an extension 70 from the inner end of the screw 68 engages to support and prevent longitudinal displacement of the spindle 64 and at the same time permit free rotation of said spindle by the rod 59.

Figure 14:
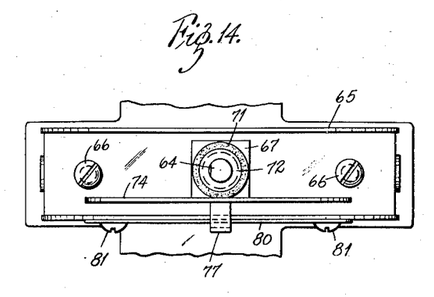
Fig. 14 is a plan view of the indicator with the cover removed.

An elastic friction roller 71 is rigid on a hub 72 mounted for longitudinal movement to different adjusted positions on, and securely attached in any of said adjusted positions to, the spindle 64 by a set screw 73 which holds the same from turning relatively to the spindle 64. The roller 71 frictionally engages the segment 74 which is pivoted upon the screw 68 for lateral swinging movements in opposite directions. A curved wall 75 is attached to the walls of the housing 65 by removable and replaceable fasteners 76 and cooperates with the walls of said housing 65 to form an enclosure for the movable parts of the indicator that have been described. A pointer 77 attached to the margin of the segment 74 midway of its side edges projects outwardly through a slot 78 in the front wall of the housing and cooperates with a graduated scale 79 to indicate the number of R. P. M. of the shaft 22 that may be attained according to the adjusted position of the cams 53. Turning of the rod 59 will cause the roller 71 to move the pointer 77 to different adjusted positions with respect to the graduations 79 in synchronism with the movement of the cams 53 with respect to the cams 50 and in coordination therewith. The graduated scale 79 may be formed directly upon the wall of the housing 65 or upon a separate plate 80 attached thereto by removable and replaceable fasteners 81 as desired.

In the modified construction shown in Figs. 15 to 20, inclusive, the reference numerals with exponents indicate features and parts analogous to the features and parts already described having the same reference numerals without exponents applied thereto, so that repeated description is unnecessary to afford an understanding thereof. This device of modified construction may be applied to different uses. For instance, it may be used as a variable speed transmission mechanism of a motor vehicle, etc. In this use of the invention, the shaft 1' may be considered an extension of the crank shaft of the engine or motor of the vehicle, and the shaft 22' as the shaft that drives the vehicle.

Figures 17, 18, 19, 20:
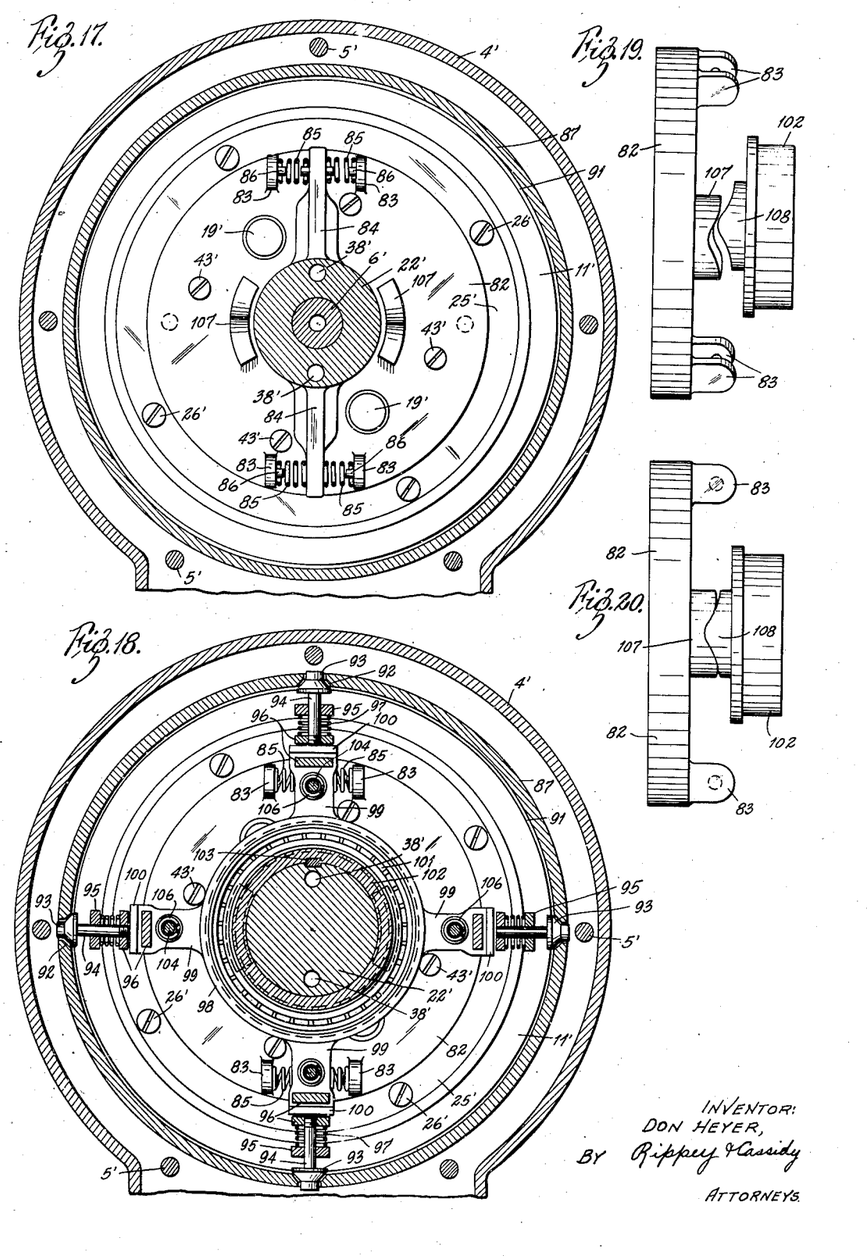
Fig. 17 is a sectional view on the line 17—17 of Fig. 15.
Fig. 18 is a sectional view on the line 18—18 of Fig. 15.
Fig. 19 is a view showing cooperating cams for automatically controlling valves that regulate the flow of fluid from the impeller devices.
Fig. 20 is a view of said cams in position to permit the valves to be closed by centrifugal force.

In this form of the invention, the stud shafts 19' which have the pinions 18' thereon are carried by an annular member 82 attached to the cover plate 20' and to cooperating elements like the elements 42 by screws 43', the internal gear 25' being attached to the impeller wall 11' by screws 26'. The annular member 82 is mounted on and is rotative with respect to the shaft 22' and has a number of pairs of spaced lugs 83 integral with its outer side. The driving means for rotating the shaft 22' by the impeller mechanism comprises a number of arms 84 integral or rigid with the shaft 22' extending between the lugs 83 of each pair of said lugs (Fig. 17). Springs 85 are mounted between each arm 84 and the adjacent lugs 83 and are supported in position by alined projections 86 on said lugs 83 and arms 84.

Thus, the connection for rotating the shaft 22' by the impeller mechanism is resilient or yielding to the capacity of the springs 85.

In this construction, the wall 8' is formed with an integral cylindrical extension wall 87 (Fig. 15) which encloses the transmission devices described. An end wall 88 is attached to the end of the wall 87 by removable and replaceable fasteners 89 and has a bearing formation 90 through which the shaft 22' extends for relative rotation. The wall 88 forms leak-proof joints with the wall 87 and the shaft 22'. The walls 8', 87 and 88 form an enclosure, and the fluid may pass from between the walls 8' and 11' through a space 91 between the walls 11' and 87 and through a number of ports 92 into the housing 4'. The ports 92 are controlled by valves 93 having their stems 94 operating through guides 95 integral with the wall 88 and having cam blocks 96 attached to their inner ends inwardly beyond the guides 95 and actuated by centrifugal force to close the valves 93 in opposition to springs 97 interposed between said cam blocks and the guides 95.

Figures 15, 16:
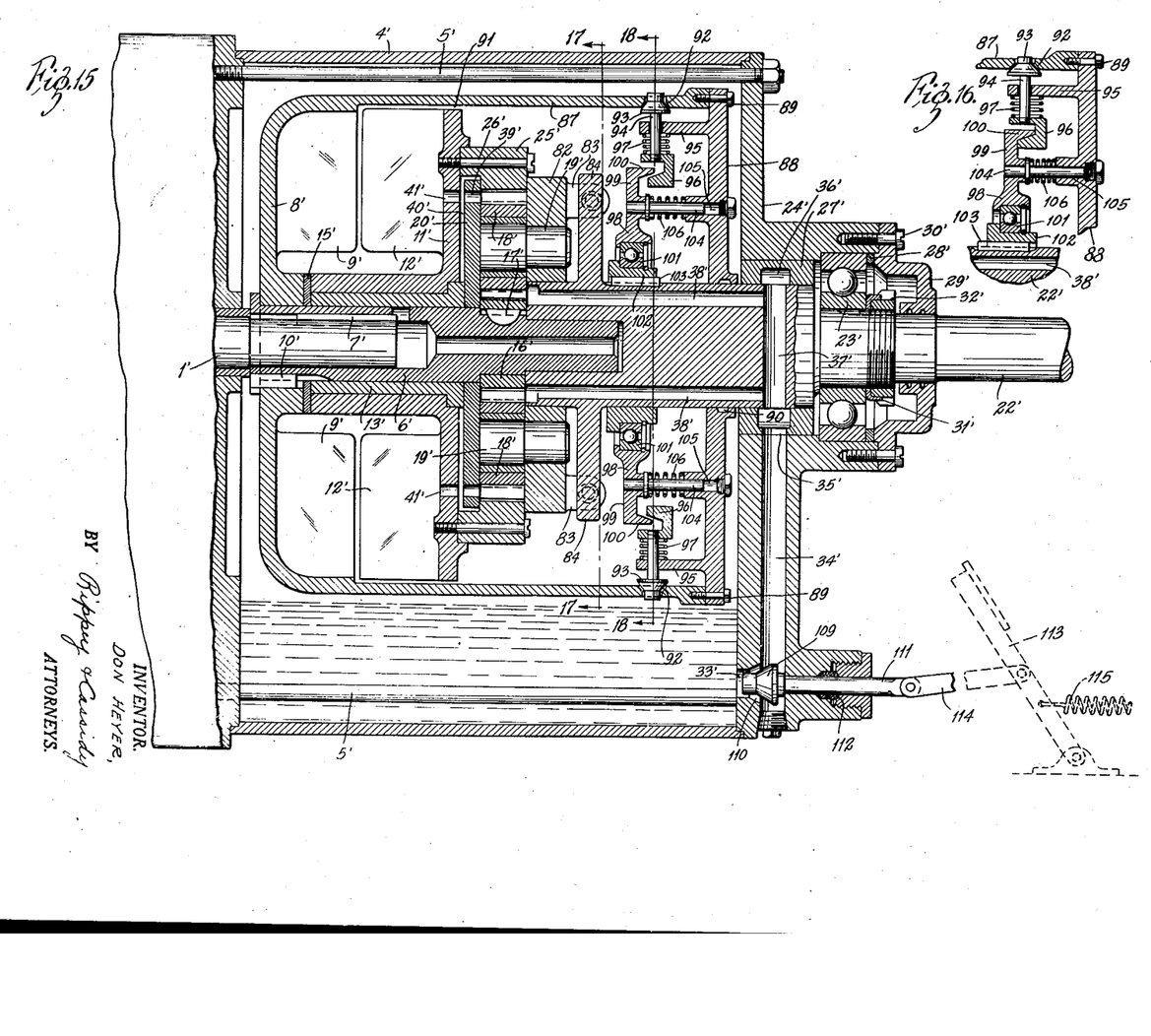
Fig. 15 is a sectional view similar to Fig. 1, showing a power transmission mechanism having fluid control devices of modified construction.
Fig. 16 is a sectional view similar to that of Fig. 15 showing the valve control device in a different position from that shown in Fig. 15.

A spider comprising a ring 98 and radial arms 99 controls the valves 93 by cams 100 on the ends of the arms 99 cooperating with the cams 96. The ring 98 is supported by a bearing 101 mounted on a sleeve 102 slidably mounted on the shaft 22' by a key 103 which rotates said sleeve with said shaft and permits longitudinal movements of said sleeve together with the spider device mounted thereon to different positions with respect to the cams 96 in order to control the valves 93 by the cams 100. Pins 104 attached to the arms 99 extend for sliding movements into guides 105 in the plate 88, and springs 106 on the pins 104 interposed between the arms 99 and the guides 105 actuate the spider device and thereby the cams 100 in a direction toward the impeller mechanism, leaving the cam blocks 96 free to be moved by centrifugal force in opposition to the springs 97 to close the valves 93 and prevent flow of fluid from within the impeller mechanism through the ports 92 into the housing 4'. If the cams 100 be moved laterally away from the impeller mechanism, they will prevent closing of the valves 93 by the centrifugal devices 96, maintain the ports 92 open, and permit the fluid to be metered through said ports 92 from within the impeller chamber into the housing 4' in proportion to the torque requirements, resulting in a relative slowing down or reduction in speed of rotation of the shaft 22' and a consequent reduction in speed of operation of the driven mechanism.

Cam devices 107 are formed on the annular member 82 and extend toward the sleeve 102 which has thereon cooperating cams 108. When the mechanism is started, or an increased load is encountered, the springs 85 will yield to permit a degree of relative rotation of the impeller mechanism with respect to the shaft 22', and a consequent cooperation of the cams 107 and 108 to move the sleeve 102 in a direction to engage the cams 100 with the cams 96 and thereby positively open the valves 93 and retain said valves open against the centrifugal force applied thereto. So long as the valves 93 are positively held open by this engagement of the cams 100 with the cams 96, the fluid may flow through the ports 92 and there will be an immediate decrease in volume of fluid in the impeller chamber in proportion to the torque requirements, with a consequent reduction of the speed at which the shaft 22' is rotated.

The amount of fluid passing through the passage 34', etc. to the impeller devices in order to regulate the transmission mechanism may be controlled by a valve 109 movable to and from a valve seat 110 at the port 33'. The valve 109 has a stem 111 extending for longitudinal sliding movements through a gland packing seal 112 to connection with an operating device. As indicated, the operating device may comprise a pedal lever 113 operatively connected by a link 114 with the valve stem 111 whereby the valve may be moved to or toward closed position against the seat 110 to stop or to regulate the flow of fluid through the passage 34', etc., to the impeller chamber.

A spring 115 may be utilized to open and to hold open the valve 109 to permit free and uninterrupted flow of the fluid through said passage 34', etc.

Figure 21:
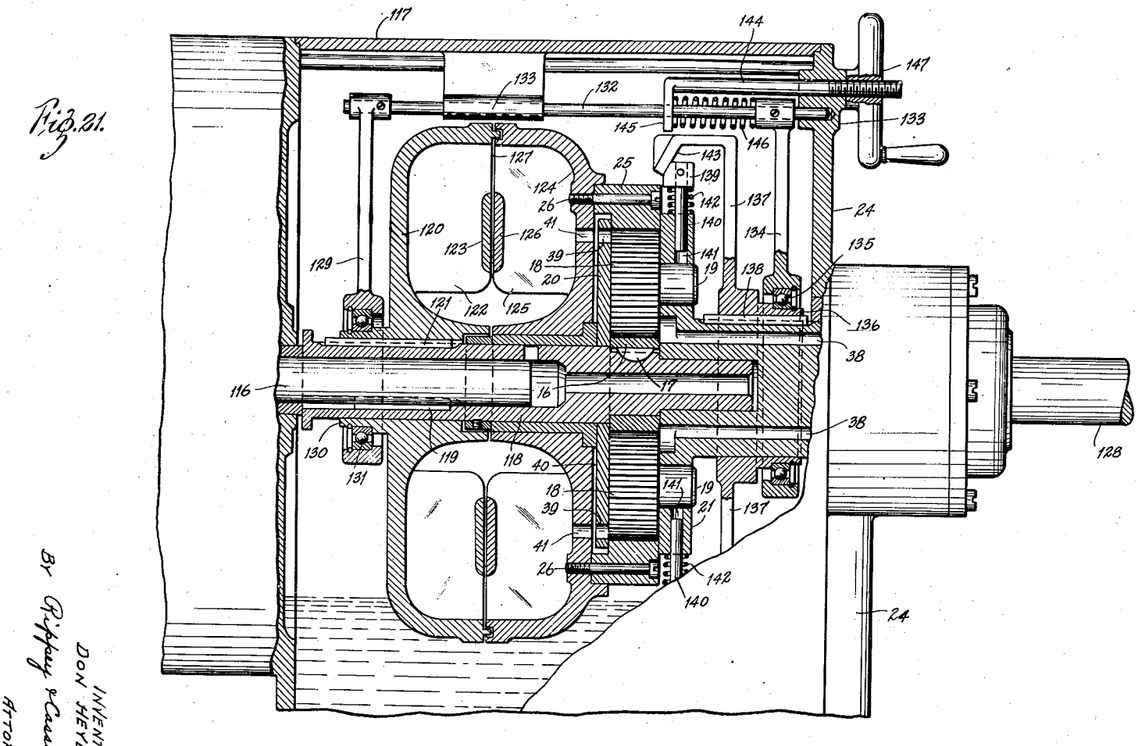
Fig. 21 is a longitudinal sectional view similar to Fig. 1, showing another embodiment of parts of the invention.

In the embodiment of the invention shown in Fig. 21, the power shaft 116 extends into the housing 117 which encloses the automatic power transmission mechanism. A shaft 118 is telescoped on and attached to the shaft 116 by a key 119 for rotation thereby and is wholly within the housing 117. One of the impeller units—in this instance the driving impeller unit—is mounted for longitudinal movement toward and from the driven impeller unit, as required to reduce and increase the space between said units for flow of fluid from within the impeller chamber. As shown, the driving impeller unit comprises a wall 120 mounted for sliding movements on the shaft 118 and connected by a spline 121 with said shaft for rotation thereby. A series of vanes 122 are formed integral with the wall 120, and their free edges are integrally united by an annular web 123. The driven impeller unit comprises a wall 124 cooperating with the wall 120 to form an impeller chamber, and a series of vanes 125 complementary to the vanes 122 integral with the wall 124 and integrally connected by an annular web 126 similar to the web 123 and cooperating therewith to cause circulation or flow of the fluid within the impeller chamber. A space 127 is provided between the adjacent edges of the walls 120 and 124 for the passage of fluid from the impeller chamber. This space is regulated by automatic means to maintain the speed of the load driving shaft 128 in accordance with the requirements of the load.

The load driving shaft 128 is analogous to the shafts 22 and 22' and is provided with the fluid passages 38 opening into the fluid gear pump housing formed by the plate 20, flange 21 and annular gear 25, arranged as shown in Fig. 1, et seq. The shaft 128 is held in axial alinement with the shafts 116 and 118 by the same type of telescoping engagement and bearing in the end plate 24 as before described in connection with Fig. 1. The pinion 16 is attached to the shaft 118 by the key 17 and rotated constantly with said shaft and at the same speed, and rotates the pair of diametrically opposite pinions 18 which mesh with the internal gear 25 to function as transmission gearing for the shaft 128 and also as a fluid pump mechanism. From the fluid gear pump housing, fluid passes through the ports 39 into the space 40 and thence through ports 41 into the impeller chamber.

An impeller shaft yoke 129 is mounted on the hub 130 of the driving impeller by an appropriate bearing device 131, and is attached to a rod 132 mounted for sliding movements in bearings 133 rigid with parts of the housing. A centrifugal shift yoke 134 is supported on an appropriate bearing 135 mounted on the hub 136 of a centrifugal spider comprising a pair of diametrically opposite arms 137 integral with said hub. This spider is connected with the load driving shaft 128 by a spline 138 rotating the spider with the shaft and permitting longitudinal movements of the spider along the shaft. The outer end of the yoke 134 is attached to the rod 132 so that said rod will be moved or shifted longitudinally by longitudinal movements of the shift yoke 134 under control of the centrifugal spider. A pair of centrifugal weights 139 are attached to the outer end of rods 140 mounted for radial sliding movements in radial guides 141 in the flange 21 and provided with silencer springs 142 located between the flange 121 and said weights. The weights 129 are in the form of cams and control complementary cams 143 attached to the ends of the arms 137 so that, when said cam weights 139 are urged outwardly by centrifugal force, they will operate against the cams 143 and move the spider on which the arm 134 is mounted.

A control yoke comprising a rod 144 mounted for longitudinal adjusting movements in the plate 24 and an arm 145 having a hole through which the rod 132 extends for sliding movements, cooperates with the yoke 134 and an interposed spring 146 to regulate shifting of the driving impeller 120. A control wheel 147 is screwed on the outer end of the rod 144 and constitutes means for controlling said rod to regulate the tension of the spring 146. When the shaft 128 is driven at a predetermined speed regulated by the control yoke and spring 146, the centrifugal devices 139 will operate these connections to enlarge the space 127 to permit sufficiently free flow of the fluid from within the impeller chamber to reduce the speed of rotation of the shaft 128.

In this construction, the webs 123 and 126, in cooperation with approximately curved portions of the walls 120 and 124, facilitate the flow of the fluid within the impeller chamber and substantially prevent formation of inert pockets or quantities of fluid therein when the mechanism is in operation.

It is clear that this invention attains all of its intended objects and purposes efficiently and satisfactorily. It may be applied to various uses with only slight adaptation of the parts and without departure from the nature and principle of the invention. The mechanism may be varied in other particulars as widely as the scope of equivalent limits will permit without departure from the principle thereof as the invention is defined by the appended claims.

Any of the forms of the invention may be applied to various uses when equipped with the needed adaptations. The transmission mechanism may be used as the power transmission mechanism for motor vehicles, or as a power transmission for maintaining a constant output speed through the shafts 22 and 22' and other associated parts or mechanisms, or for operating standard machine tools, etc. These are only a few suggestions of uses to which the invention may be easily applied. The transmission mechanism provided with a torque control as shown in Figs. 15 to 20, inclusive automatically maintains the proper volume of fluid in the impeller chamber in accordance with load requirements, and is arranged with the automatic centrifugal controls to operate in conjunction with the torque control. This torque control for the transmission mechanism comprises the arms 84 which are rigid with the shaft 22' extending between the lugs 83 affixed to the annular member 82, as shown in Fig. 17. When power is applied to the transmission mechanism, the drag caused by the load on the shaft 22' causes the opposing springs 85 to compress, and a slight displacement of the arms 84 relative to the normal position of the same results. This displacement of the arms 84 operates to move the spider ring 98 axially along the shaft 22' by means of the cams 107 on the annular member 82 and the cams 108 on the sleeve 102. When the sleeve 102 is moved in this manner by the cams 107 and 108, the radial arms 99 are caused to engage the cams 100 with the cams 96 and thereby open the valves 93, allowing the fluid to be discharged from the chamber. The centrifugal control is arranged to become inoperative at a certain minimum speed so that the fluid is discharged from the impeller chamber in accordance with the load requirements as shown. Also, when the input speed of the power source, which may be a motor or engine of any appropriate type, is reduced to a certain value, the centrifugal control devices will allow the fluid to be discharged from the impeller chamber as rapidly as it is supplied thereto so that, as a consequence, the driving impeller will not have a sufficient volume of fluid to discharge into the driven impeller and the load shaft 22', etc., will be disconnected from the power source and will function similar to a clutch. Obviously, additional controls may be provided in the intake line 34, 38 to stop the flow of the fluid positively and require an absolute disconnection between the power source and the load shaft 22', etc., if the valves 44 do not function to prevent flow of the fluid to the impeller chamber.

However, under ordinary operations, it is deemed to be unnecessary to use any additional or supplemental control means and the vehicle may be controlled by the accelerator pedal only; and, as the speed of the power source is reduced to a minimum value, the fluid will be automatically discharged from the impeller chamber and the vehicle will be stopped. When the speed of the power source is accelerated, the centrifugal control devices automatically close the valves and provide proper volume of fluid in cooperation with the torque control to attain the proper ratio of reduction in speed between the power source and the load shaft 22', etc., in accordance with the load requirements.

In the mechanism shown, the driven impeller is rotated at a slower speed than the driving impeller and in a reverse direction. The driving impeller which is operating at the speed of the power source circulates the fluid within the impeller chamber and, as the fluid is thrown outwardly by centrifugal force, it impinges against the blades 12, etc., of the driven impeller and gives up its kinetic energy and thereby reduces the speed of the driven impeller in the direction in which it is running, and the resultant reduction in speed of the driven impeller effects the change in the speed of the load driving shaft 22, etc., by means of the gearing arrangement. The fluid, after it has given up its energy, follows the outer wall of the driven impeller toward the center of the impeller chamber and thence into the driving impeller where it is again picked up and recirculated. A certain amount of the fluid passes from the fluid chamber through the opening between the impellers and is being constantly replaced by the fluid gear pump to maintain the proper volume of fluid in the impeller chamber in accordance with the load requirements or in accordance with the setting of the control.

In certain uses of the invention, it may be desirable to employ additional cooling means (not shown) to dissipate the heat from the fluid.

It is now apparent that the invention attains all of its objects and purposes very efficiently, and that the operations of many of the parts and devices are automatic. The parts are assembled in such a way that they may be easily removed and replaced, and they may be varied as to form and arrangement as well as otherwise within the scope of the invention.

I claim:

1. In an automatic power transmission mechanism having a fluid driving impeller, a power device for operating said driving impeller, a load driving shaft, a fluid driven impeller operated by fluid driven by said driving impeller, and gearing for rotating the load driving shaft by said driven impeller; torque controlled automatic means operated by said load driving shaft for maintaining the speed of said shaft in accordance with the load requirements.

2. In an automatic power transmission mechanism having a fluid driving impeller, a load driving shaft, a fluid driven impeller, and gearing for rotating the load driving shaft by said driven impeller; means forming passages for conducting fluid to said gearing and from said gearing to said impellers, and means for controlling said passages to regulate the flow of fluid and thereby maintain the speed of the load driving shaft in accordance with the requirements of the load.

3. In an automatic power transmission mechanism having a fluid driving impeller, a load driving shaft, a fluid driven impeller, and gearing for rotating the load driving shaft by said driven impeller; means forming passages for conducting fluid to said gearing and from said gearing to said impellers, valves for controlling said passages to regulate the flow of fluid and thereby maintain the speed of the load driving shaft in accordance with the requirements of the load, and centrifugal devices operated by said load driving shaft for operating said valves.

4. An automatic power transmission including a fluid driven impeller, a fluid driving impeller discharging fluid into the driven impeller to operate the latter and cooperating with the driven impeller to form an impeller chamber, a pinion, a shaft attached to and operating said driving impeller and said pinion, a number of pinions meshing with said first named pinion, an internal gear attached to said driven impeller and engaging said number of pinions, and means cooperating with all of said pinions and said gear and forming therewith a fluid gear pump opening into said impeller chamber for discharging fluid into said chamber.

5. An automatic power transmission including a fluid driven impeller, a fluid driving impeller discharging fluid into the driven impeller to operate the latter and cooperating with the driven impeller to form an impeller chamber, a pinion, a shaft attached to and operating said driving impeller and said pinion, a number of pinions meshing with said first named pinion, an internal gear attached to said driven impeller and engaging said number of pinions, and means cooperating with all of said pinions and said gear and forming therewith a fluid gear pump opening into said impeller chamber for discharging fluid into said chamber in accordance with the load requirements.

6. An automatic power transmission including a fluid driven impeller, a fluid driving impeller discharging fluid into the driven impeller to operate the latter and cooperating with the driven impeller to form an impeller chamber, a pinion, a shaft attached to and operating said driving impeller and said pinion, a number of pinions inmeshing with said first named pinion, an internal gear attached to said driven impeller and engaging said number of pinions, means cooperating with all of said pinions and said gear and forming therewith a fluid gear pump opening into said impeller chamber for discharging fluid into said chamber, and devices controlling the amount of fluid delivered into said chamber in accordance with a predetermined control setting.

7. An automatic power transmission including a shaft, a fluid driven impeller, a fluid driving impeller operated by said shaft discharging fluid into the driven impeller to operate the latter and cooperating therewith to form an impeller chamber adapted to receive said fluid, a pinion attached to said shaft, an internal gear attached to said driven impeller, a number of pinions supported between and engaging said first named pinion and said gear, means cooperating with said pinions forming a fluid gear pump opening into said impeller chamber for discharging fluid into said chamber in accordance with the load requirements, and means for regulating said fluid to control the operation of said driven impeller in accordance with the load requirements.

8. An automatic power transmission including a shaft, a fluid driven impeller supported by said shaft, a fluid driving impeller operated by said shaft and cooperating with said driven impeller to form an impeller chamber having a discharge outlet, a load shaft, and devices supported by said first shaft and said load shaft forming a fluid gear pump opening into said impeller chamber for discharging fluid into said chamber in accordance with the load requirements whereby said driving impeller will operate said driven impeller and thereby said fluid gear pump and said load shaft.

9. An automatic power transmission including a shaft, a fluid driven impeller supported by said shaft, a fluid driving impeller operated by said shaft and cooperating with said driven impeller to form an impeller chamber having a discharge outlet, a load shaft, devices supported by said first shaft and said load shaft forming a fluid gear pump opening into said impeller chamber for discharging fluid into said chamber in accordance with the load requirements whereby said driving impeller will operate said driven impeller and thereby said fluid gear pump and said load shaft, and means for regulating the amount of fluid passing into said impeller chamber in accordance with the load requirements of said load shaft.

10. An automatic power transmission including a shaft, a fluid driven impeller supported by said shaft, a fluid driving impeller operated by said shaft and cooperating with said driven impeller to form an impeller chamber having a discharge outlet, a load shaft, devices supported by said first shaft and said load shaft forming a fluid gear pump opening into said impeller chamber for discharging fluid into said chamber in accordance with the load requirements whereby said driving impeller will operate said driven impeller and thereby said fluid gear pump and said load shaft, and centrifugal means for regulating the amount of fluid passing into said impeller chamber in accordance with the load requirements of said load shaft.

11. An automatic power transmission including a shaft, a fluid driven impeller supported by said shaft, a fluid driving impeller operated by said shaft and cooperating with said driven impeller to form an impeller chamber having a discharge outlet, a load shaft, devices supported by said first shaft and said load shaft forming a fluid gear pump opening into said impeller chamber for discharging fluid into said chamber in accordance with the load requirements whereby said driving impeller will operate said driven impeller and thereby said fluid gear pump and said load shaft, centrifugal means for regulating the amount of fluid in the said impeller chamber in accordance with the load requirements of said load shaft, and manual means for controlling effective operation of said centrifugal means.

12. An automatic power transmission including a shaft, a fluid driven impeller supported by said shaft, a fluid driving impeller operated by said shaft and cooperating with said driven impeller to form an impeller chamber having a discharge outlet, a load shaft, devices supported by said first shaft and said load shaft forming a fluid gear pump opening into said impeller chamber for discharging fluid into said chamber in accordance with the load requirements whereby said driving impeller will operate said driven impeller and thereby said fluid gear pump and said load shaft, centrifugal means for regulating the amount of fluid in the said impeller chamber in accordance with the load requirements of said load shaft, and means for indicating the number of R. P. M. of the load shaft attainable by the transmission.

13. An automatic power transmission comprising a fluid driving impeller, a fluid driven impeller cooperating with said driving impeller to form an impeller chamber, a housing enclosing said impellers adapted to contain fluid, means for conducting fluid from said housing into said impeller chamber for operation of said driven impeller by said driving impeller, a manually adjustable device for regulating the passage of fluid through said means, a load shaft, and mechanism for operating said load shaft by said driven impeller and for delivering fluid from said housing into said chamber.

14. An automatic power transmission comprising a fluid driven impeller, a fluid driving impeller cooperating with said driven impeller to form an impeller chamber having a discharge outlet, a housing enclosing said impellers adapted to contain fluid, means for conducting fluid from said housing into said impeller chamber for operation of said driven impeller by said driving impeller, a load shaft, mechanism for operating said load shaft by said driven impeller and for delivering fluid from said housing into said chamber, and centrifugal devices operated by said load shaft for regulating the delivery of fluid into said chamber.

15. An automatic power transmission comprising a fluid driven impeller, a fluid driving impeller cooperating with said driven impeller to form an impeller chamber having a discharge outlet, a housing enclosing said impellers adapted to contain fluid, means for conducting fluid from said housing into said impeller chamber for operation of said driven impeller by said driving impeller, a load shaft, mechanism for operating said load shaft by said driven impeller and for delivering fluid from said housing into said chamber, and centrifugal devices operated by said load shaft for enlarging or reducing said outlet from said chamber.

16. An automatic power transmission comprising a fluid driven impeller, a fluid driving impeller cooperating with said driven impeller to form an impeller chamber having a discharge outlet, a housing enclosing said impellers adapted to contain fluid, means for conducting fluid from said housing into said impeller chamber for operation of said driven impeller by said driving impeller, a load shaft, mechanism for operating said load shaft by said driven impeller and for delivering fluid from said housing into said chamber, centrifugal devices operated by said load shaft for regulating the delivery of fluid into said chamber, means for controlling effective operation of said centrifugal devices, and means for indicating the number of R. P. M. of the load shaft attainable by the transmission after any presetting of said controlling means.

17. In an automatic power transmission mechanism having a fluid driven impeller, a fluid driving impeller cooperating with said driven impeller to form an impeller chamber, and a load driving shaft; fluid gear pump mechanism for delivering fluid into said chamber and for rotating said shaft by said driven impeller, and mechanism controlled by said driving shaft controlling delivery of fluid into said impeller chamber and the number of R. P. M. of the driving shaft attainable by the transmission.

18. In an automatic power transmission mechanism having a fluid driven impeller, a fluid driving impeller cooperating with said driven impeller to form an impeller chamber, and a load driving shaft; fluid gear pump mechanism for delivering fluid into said chamber and for rotating said shaft by said driven impeller, mechanism controlled by said driving shaft controlling delivery of fluid into said impeller chamber and the number of R. P. M. of the driving shaft attainable by the transmission, and mechanism for indicating the number of R. P. M. of said driving shaft attainable by the transmission.

19. In an automatic power transmission mechanism having a fluid driven impeller, a fluid driving impeller cooperating with said driven impeller to form an impeller chamber, and a load driving shaft; mechanism for delivering fluid into said chamber and for rotating said shaft by said driven impeller, mechanism controlling delivery of fluid into said impeller chamber and the number of R. P. M. of the driving shaft attainable by the transmission mechanism, and centrifugal devices controlled by said driving shaft controlling said mechanism and thereby the number of R. P. M. of the driving shaft attainable by the transmission.

20. An automatic power transmission including differentially movable fluid driving and fluid driven impeller devices associated for operation of said driven impeller device by fluid actuated by said driving impeller device, a load driving shaft operated by gearing means and said driven impeller device, and means operated automatically and incidentally to operation of said shaft for changing the speed of said shaft in stepless increments in accordance with the requirements of the load irrespective of the speed of said driving impeller device.

21. In an automatic power transmission mechanism having a driving shaft, a load shaft, differentially movable fluid driving and fluid driven impeller devices for operation of said driven impeller device by fluid actuated by said driving impeller device, and gearing for rotating said load shaft by said driven impeller device; automatic means controlling the speed of said load shaft in accordance with load requirements irrespective of the speed of said fluid driving impeller.

22. In an automatic power transmission mechanism having a fluid driving impeller, a fluid driven impeller cooperating with said driving impeller to form an impeller chamber, and a load shaft; means for delivering fluid into said chamber for rotating said driven impeller by said driving impeller, and visual speed indicating means cooperating with manually adjustable automatic control means indicating and regulating the effective speed of said load shaft.

23. In an automatic power transmission mechanism, a fluid driving impeller, a fluid driven impeller cooperating with said driving impeller to form an impeller chamber, a casing enclosing said impellers, a load shaft having a passage communicating with said chamber for conducting fluid thereto, a valve supported by said shaft controlling said passage, and an electric motor mounted on said casing and having its driving shaft extending into said casing supporting and operatively connected with said driving impeller for operating said driving impeller and thereby said driven impeller by fluid within said impeller chamber.

24. An automatic power transmission including fluid impeller transmitting means provided with centrifugal means to maintain the speed of a load driving shaft in accordance with the requirements of the load, a device movable to selected adjusted positions to control effective action of said centrifugal means and thereby regulate the speed of said load driving shaft, and a manually operative actuator connected with said device for moving said device to and holding the same in said selected positions to control effective action of said centrifugal means and thereby regulate the speed of said load driving shaft, as aforesaid.

25. An automatic power transmission comprising a fluid driving impeller, a fluid driven impeller supported for differential movements with respect to and cooperating with said driving impeller to form an impeller chamber adapted to contain fluid for operation of said driven impeller by said driving impeller, a load shaft, mechanism for operating said load shaft by said driven impeller in cooperation with said driving impeller, centrifugal elements for maintaining the speed of said load shaft in accordance with the requirements of the load, a device movable to selected adjusted positions to control effective action of said centrifugal elements and thereby regulate the speed of said load shaft, and a manually operative actuator connected with said device for moving said device to and holding the same in said selected positions to control effective action of said centrifugal means and thereby regulate the speed of said load shaft, as aforesaid.

26. An automatic power transmission comprising a fluid driving impeller, a fluid driven impeller supported for differential movements with respect to and cooperating with said driving impeller to form an impeller chamber adapted to contain fluid for operation of said driven impeller by said driving impeller, a load shaft, mechanism for operating said load shaft by said driven impeller, centrifugal elements for maintaining the speed of said load shaft in accordance with the requirements of the load, a device movable to selected adjusted positions to control effective action of said centrifugal elements and thereby regulate the speed of said load shaft, and a manually operative actuator connected with said device for moving said device to and holding the same in said selected positions to control effective action of said centrifugal means and thereby regulate the speed of said load shaft, as aforesaid.

27. In an automatic power transmission mechanism having a fluid driving impeller, a fluid driven impeller cooperating with said driving impeller to form an impeller chamber, and a load shaft; means for delivering fluid into said chamber for rotating said driven impeller by said driving impeller, centrifugal elements for maintaining the speed of said load shaft in accordance with the requirements of the load, a device movable to selected adjusted positions to control effective action of said centrifugal elements and thereby regulate the speed of said load shaft, and a manually operative actuator connected with said device for moving said device to and holding the same in said selected positions to control effective action of said centrifugal means and thereby regulate the speed of said load shaft, as aforesaid.

DON HEYER.